US012252752B2

(12) United States Patent
Poles et al.

(10) Patent No.: US 12,252,752 B2
(45) Date of Patent: Mar. 18, 2025

(54) PROCESS FOR TANNING LEATHERS, PRE-TANNING PRODUCTS AND USE THEREOF

(71) Applicant: SILVATEAM S.P.A., San Michele Mondovì (IT)

(72) Inventors: Eric Poles, Vicoforte (IT); Lorenzo Tribuzio, Vinovo (IT); Samuele Giovando, Monforte d'Alba (IT)

(73) Assignee: Silvateam S.P.A., San Michele Mondovi (IT)

( * ) Notice: Subject to any disclaimer, the term of this patent is extended or adjusted under 35 U.S.C. 154(b) by 171 days.

(21) Appl. No.: 17/691,644

(22) Filed: Mar. 10, 2022

(65) Prior Publication Data

US 2022/0298590 A1 Sep. 22, 2022

(30) Foreign Application Priority Data

Mar. 16, 2021 (IT) ........................ 102021000006233

(51) Int. Cl.
*C14C 3/28* (2006.01)
*C14C 3/10* (2006.01)
*C14C 3/22* (2006.01)
*C14C 3/26* (2006.01)

(52) U.S. Cl.
CPC .................. *C14C 3/28* (2013.01); *C14C 3/10* (2013.01); *C14C 3/22* (2013.01); *C14C 3/26* (2013.01)

(58) Field of Classification Search
CPC .... C14C 3/28; C14C 3/10; C14C 3/22; C14C 3/26
See application file for complete search history.

(56) References Cited

U.S. PATENT DOCUMENTS

| | | | |
|---|---|---|---|
| 4,762,522 A | 8/1988 | Maue | |
| 5,660,759 A * | 8/1997 | Segura | C14C 9/02 252/8.57 |
| 5,705,663 A | 1/1998 | Brock et al. | |
| 2002/0002298 A1 | 1/2002 | Bigorra Llosas et al. | |

FOREIGN PATENT DOCUMENTS

| | | |
|---|---|---|
| GB | 2057497 A | 4/1981 |

OTHER PUBLICATIONS

Green Agrochem, Lignosulphonates in Tanning https://www.lignosulfonate.com/lignosulphonates-in-tanning/ Sep. 11, 2019.*
Reetz et al. Extended surfactants for leather. XXXC IULTCS Congress Dresden 2019.*
Italian Search Report for IT Patent Application No. 202100006233, Nov. 3, 2021, Munich, DE, 8 pages.

* cited by examiner

*Primary Examiner* — Amina S Khan
(74) *Attorney, Agent, or Firm* — Armstrong Teasdale LLP

(57) ABSTRACT

A process for tanning leathers including a pre-tanning step and a tanning step is provided. In the pre-tanning step leathers are treated with a cationic active agent including a quaternized ester of a fatty acid and triethanolamine, or mixtures thereof and, subsequently, with an anionic active agent including tannins vegetable extracts and a natural or synthetic dispersant selected from the group consisting of lignosulfonates, distillation stillages, sulfonated disulfonic polymers, sulfonated naphthalene polymers or mixtures thereof, to obtain leathers with a shrinkage temperature of at least 65° C. The pre-tanning and tanning steps do not include treatment with aldehydes or aldehyde donor compounds and/or with metal salts.

12 Claims, No Drawings

PROCESS FOR TANNING LEATHERS, PRE-TANNING PRODUCTS AND USE THEREOF

CROSS-REFERENCE TO RELATED APPLICATION

This application claims priority to Italian Patent Application No. 102021000006233 filed on Mar. 16, 2021, the entire contents of which is hereby incorporated in its entirety by reference.

FIELD OF THE INVENTION

The field of application of the invention described herein is in the tanning industry, in particular in the tanning of leathers.

BACKGROUND OF THE INVENTION

Leathers come from the food industry and are a by-product of the processing of animal meats, especially beef, pork, sheep and goats. Hides coming from slaughterhouses, where they have been sprinkled with salt on the meat side to preserve them and prevent bacterial proliferation, are sent to tanning industry operations. In the tannery they are partially mechanically desalted and sent to the first operations called beamhouse. In a first step called soaking, the hides are washed to remove dirt and residual salt and at the same time restore the water content. A second step is liming and dehairing, in which the hides are dehaired at an alkaline pH with calcium hydroxide, sodium hydrogen sulfate and sodium sulfide. In a mechanical operation called fleshing, the hides are separated from the fat and horny parts. At this point the cowhides, which are the thickest, undergo a mechanical operation called splitting in which the thickness is roughly reduced to that desired for the finished article. In this step, it is not possible to control the thickness very well due to the consistency of the leather material because it is very swollen and full of water; therefore, a subsequent mechanical operation called shaving is necessary, done on all types of skins, to have the calibrated thickness required by the application. At this point the skins are said to be pelt.

Pelt skins are delimed and macerated respectively with acids up to neutral pH and with enzymes to eliminate lime residues deriving from liming and hair removal, and to remove residues of keratin, fats, melanin and hair follicles, obtaining the material with the typical soft and elastic touch from the skin, used to make all leather goods, furniture and footwear.

After maceration, the skin has a neutral pH of about 6-7 and before the subsequent tanning steps, the skin must be acidified, usually with formic acid and sulfuric acid in the presence of sodium chloride. These products are used as preservatives and therefore have the purpose of giving stability to the material, lowering the pH and increasing the osmotic pressure. The skin at this point is said to be in pickle. The pickle is a stable semi-finished product widely used for storing, transporting and marketing leathers. The step to which the present invention is directed is the one subsequent to this point, i.e. tanning.

Tanning is the step in which the leather is made stable against the attack of bacteria, thus becoming a reliable and long-lasting material. In general, quantities of about 5-10% of chromium salts (or other metals) or about 30-50% of vegetable tannins are used to tan leathers.

The tanning step may be preceded by the pre-tanning step. In this case, the pickle leathers are pre-tanned, i.e. treated with products called pre-tanning, to allow a first mechanical treatment. The mechanical processing foreseen in this step is a pressing to remove excess water from the leather and then the so-called shaving, in order to obtain a material with reduced thickness, which removes part of the skin from the flesh side which is the fibrous side, opposite to the grain side of the leather. In this step, the leathers are reduced to the thickness required by the finished article. The pre-tanned and pressed leathers may be shaved to variable thicknesses generally between 1.1-1.2 mm and 3.5 mm, depending on the final application foreseen for the article.

Shaving is an operation carried out with a machine that removes material from the flesh side of the leather, to accurately achieve the desired final thickness. This has the obvious advantage that fewer products are used in the tanning step and subsequent ones, since these are always dosed in proportion to the weight of the leather. Shaving is an operation that is always done, for any tanned or pre-tanned leather; in fact, the leathers are shaved for any final application: whether it is leather goods, footwear, furniture or automotive.

Given the amount of heat developed by friction during the shaving step, in order to shave the skins without damaging them, they must be sufficiently resistant to heat, i.e. have a shrinkage temperature of at least 65° C. The shrinkage temperature, known as ST, is the temperature at which a sample of skin begins to shrink, losing its softness features because the collagen proteins are denatured. ST is measured with the standard method ISO 3380:2015 Leather—Physical and mechanical tests—Determination of shrinkage temperature up to 100° C. Pelt and pickle skins have a maximum ST around 54° C. In order to increase the ST, the leathers are treated with pre-tanning or tanning products.

The products used in pre-tanning also allow the leathers to be prepared for tanning, that is, they allow the products used in tanning to act more effectively.

In general, aldehydes (or aldehyde donors) or synthetic tannins are used to pre-tan leather. To produce high quality leathers such as those used for automobiles, it is common practice to use glutaraldehyde in the pre-tanning step. The latter, being a very reactive aldehyde, however, has major problems of toxicity and high environmental impact both on the waste water of the tannery and in the working environment during use in the tannery. Alternatively, it is also possible to use substances that are not really aldehydes, but which release aldehydes during use, actually acting as if they were. The so-called aldehyde donors, such as the oxazolidines that decompose in water, releasing formaldehyde, are part of this category of substances. For this reason, these substances may only be used with due precautions to avoid excessive release of aldehydes. Synthetic tannins, also used in pre-tanning, being synthetic products obtained mainly from polymerization reactions of formaldehyde with phenol sulfonate in various ways, may cause formaldehyde or phenol contamination in the treated leathers.

After the pre-tanning step, the leathers are reduced in thickness with the shaving operation, reaching calibrated thicknesses. For this reason, the products used to obtain pre-tanned leathers are partly lost as they are part of the thickness portion that is eliminated. It is therefore convenient to use the least possible quantity of products for pre-tanning the leathers. However, there are technological limits to using low quantities of pre-tanning agents; in fact, it is necessary that the leathers are stabilized to a certain extent to the heat developed during shaving. Thermal resistance is measured with the shrinkage temperature (ST).

Each pre-tanning product has its own minimum dose necessary to obtain leathers with a ST of 65° C. acceptable for shaving the leathers obtained. Referring to the weight of the pelt, if chromium salts are used, already treating with 7% of basic chromium sulfate, an excellent effect is obtained on the ST that reaches over 100° C. On the other hand, treating with glutaraldehyde, it takes 2% to have a ST of about 75-78° C.; with about 25% of a phenolic-type synthetic tannin one gets to a ST of about 70° C., while with vegetable tannins it is necessary to use quantities of 30-40% to reach a ST of 80° C.

In the tanning step, the pre-tanned leathers may be treated with various types of tanning products. Traditionally, the leathers are tanned with natural extracted tannins. In recent decades, however, most of the leathers are tanned with trivalent chromium salts, in particular with basic chromium sulfate. Other alternative processes use aluminum or zirconium salts. After tanning, the tanned leather undergoes further processing steps which are normally fattening, dyeing and finishing. The products used in tanning and pre-tanning have a particular importance because they are the main ones responsible for most of the features of touch and mechanical resistance of the finished leathers. To date, metals are the substances that allow leathers with the best features of mechanical, light and heat resistance to be obtained.

In recent years, however, attempts have increasingly been made to make leathers that do not contain aldehydes or metals. This is an increasingly pressing request from the tanning market, above all due to the environmental impact of the chemical industry that supplies the tanning products, the environmental impact of the tanning industry in general, the risks for the operators of the tannery, and for contact allergies generated on the user.

Vegetable tannins seem to be the most interesting choice for a sustainable process as they have a low environmental impact during their production, a low risk for operators in the sector and for users of finished leathers.

Vegetable tannins, however, have known limitations in their use due to the fact that important quantities must be used during pre-tanning to reach an acceptable ST. This means that the cost of the treatment with vegetable tannins is high and not industrially practicable, also in view of the fact that, for the pre-tanning, part of the pre-tanned leather is eliminated by shaving to obtain what will be the finished material. At lower dosages, vegetable tannins, being very reactive with the proteins contained in the skin, produce only superficially tanned skins, as the product is not able to reach the inside of the leathers, but is exhausted on their surface. The leathers thus obtained would not be suitable for shaving operations and would not be stable to the attack of bacteria.

In particular, with the process object of the present invention, it is possible to obtain pre-tanned leathers with vegetable tannins and which may be shaved.

In addition to their cost, the use of pre-tanning vegetable tannins is generally limited for other reasons related to the features and performances such as softness, color and resistance to light and heat of the finished leathers. In fact, high quantities of vegetable tannins, usually necessary for pre-tanning the leathers, lead to hard leathers, called cardboard, of a color ranging from beige to dark reddish brown. Due to this feature, it is impossible to obtain pre-tanned or tanned leathers with vegetable tannins and with light or pastel colors. The leathers obtained with vegetable tannins also have poor fastness to light and heat. This is usually measured with the artificial light aging test ISO 105-B02:1994—Color fastness of leather to light: xenon lamp. In this test, leather that has been exposed to the light and heat of a xenon lamp is compared on a gray scale to non-exposed leather and the color difference is expressed on a scale of 1 to 5, which respectively mean slight toning and high toning. Automotive leathers are those that have the strictest acceptability requirements regarding lightfastness, as they must comply with specifications imposed by car manufacturers which generally only accept leathers with color toning lower than 1 in the gray scale. Leathers treated with vegetable tannins, due to the fact that a high quantity of them must be used, generally are not able to meet this requirement.

For these needs, leathers pre-tanned with aldehydes, especially glutaraldehyde, or tanned with chromium, in particular basic chromium sulfate, are the most versatile. In particular, from the point of view of performances, chromium is the treatment that allows better leathers to be obtained.

The primary object of the present invention is to provide a process that allows versatile leathers to be obtained, such as those obtained from glutaraldehyde or chromium, but without aldehydes or aldehyde donors or metals, but using vegetable tannins without having the typically known negative effects of these products.

Another object of the invention is to provide a process based on the combined use in sequence of non-toxic products with low environmental impact.

Yet another object of the invention is to provide a process which allows the re-use of the tanning baths, thus reducing the load of organic substances present in the waste water of a tannery.

SUMMARY OF THE INVENTION

The objects of the present invention are a tanning process, pre-tanning products and their use in pre-tanning, as defined in the appended claims.

The technology object of the present invention is based on the sequential use of two substances, suitably formulated, in the pre-tanning step or, alternatively, the first in the pre-tanning and the second divided between the pre-tanning and the tanning. In particular, the present invention provides for the use, in the pre-tanning step, of a substance based on a cationic ester as the first treatment. This makes the leathers more cationic and therefore reactive towards a second anionic substance to be used for the subsequent treatment. This last treatment may be done already during the pre-tanning step and then also during the tanning. The anionic substance is based on a mixture of highly reactive natural tannins, dispersed in a dispersing agent, as defined below, selected to ensure stability and moderate the reactivity of the natural tannin which otherwise would not be usable to tan a leather.

The process allows leathers with better technical features than those obtained with natural tannins to be obtained. Consequently, the leathers obtained have sufficient performances to meet the needs of high-level applications in the automotive, footwear and leather goods sectors. The leathers thus obtained are innovative as they are free from glutaraldehyde (or other aldehydes or aldehyde donors), chromium (or other metals) and have organoleptic and mechanical features that so far could not be obtained without the use of the pre-tanning agents mentioned above and/or vegetable tannins in such high quantities as to be of little interest from an economic point of view. With the proposed technology it is sufficient to treat with 1-3% of cationic product, followed by 10-15% (percentages by weight referring to the weight of the leather in pickle) of anionic product to obtain leather with a ST of 70-75° C. and which therefore may withstand the shaving step. With the process according to the present invention, it is possible to obtain pre-tanned leathers which may be shaved, even using relatively low quantities of vegetable tannins compared to the standard quantities required, leading to less waste of products.

The proposed technology also has a further advantage because it allows the reuse of tanning baths, which may be interesting because the load of polluting organic substances present in the waste water of the tannery may be reduced. In fact, certain pre-tanning and tanning products normally used do not allow a very high recovery of the baths due to the impurities contained which would rapidly increase in concentration and which would make them unusable if not in small quantities in the tanning baths. The baths coming from the treatment with the proposed technology, on the other hand, may be totally reused, reaching an effective and problem-free exhaustion on the obtained leathers.

DETAILED DESCRIPTION

The Cationic Product

The cationic product contains an active substance belonging to the family of quaternary ammonium salts, in particular a quaternized ester of a fatty acid and triethanolamine. The quaternizing agent is typically dimethyl sulfate, but other quaternizing agents may be used. Preferably, the cationic product contains a dialkyl ester of triethanolamine methyl sulfate, in which the alkyl is linear or branched and has 12 to 24 carbon atoms, also known as dialkyl dihydroxyethylammonium methyl sulfate or esterquat. Within this family, the following substances are of particular interest:

- distearoylethyl hydroxyethylammonium methyl sulfate (also known as distearoylethyl hydroxyethylamonium methosulfate) or (2-hydroxyethyl)methylbis[2-[(1-oxooctadecyl)oxy]ethyl]ammonium methyl sulfate (also commercially known as Esterquat 75);
- disteaoroylethyl hydroxyethylammonium methyl sulfate mixed with cetearyl alcohol (also commercially known as Dehyquart F75); and
- docosanyltrimethylammonium methyl sulfate (also known as docosyltrimethylammonium methyl sulfate).

The active substances described are part of a class of non-toxic and plant-derived substances deriving from the fatty acids of vegetable oils, such as rapeseed oil or coconut oil. These substances are typically used as cationic surfactants and conditioning agents in cosmetic products, mainly in shampoos.

Quaternary ammonium ions with long-chain substituents have characteristics of surfactants and for this reason, depending on the substituents present, they are used as detergents and as biocides. The products of particular interest for use according to the invention are known and generally used as fabric softeners or as hair conditioners.

The above cationic products may for example be prepared by the process described in U.S. Pat. No. 5,705,663, which relates to a process for the production and use of quaternized esters of fatty acids and triethanolamine, prepared from triethanolamine, fatty acid, fatty acid ester and a quaternizing agent. According to what has been published, the quaternized esters of fatty acids and triethanolamine thus prepared may be used to produce laundry softeners having a high active content, resistant to rinse cycles and particularly stable in viscosity during storage.

The production process is also reported, for example, in U.S. document 2002/0002298, where a process for the production of esterquats is described in which triglycerides are transesterified with alkanolamines and the resulting alkanolamine esters of fatty acids are subsequently quaternized with alkyl halides or dialkyl sulfates in the presence of solvents, characterized in that the glycerol released during transesterification is continuously removed from the reaction equilibrium.

As mentioned, these substances are known and used as surfactants and for their softening properties. These are mainly used on fabrics and hair. In some cases, it is known that they may also be used as softeners for finished leathers, but exclusively as touch modifiers for chrome leathers, as products with which to treat leathers after tanning and only to impart softness in the fattening step. In no case have they already been described to prepare the leather for tanning in the pre-tanning step, so that it is more reactive to the products used.

In order to facilitate its use in the process according to the invention, the cationic active substance product is preferably formulated in a formulation comprising a solvent (for example: water, ethanol, n-propanol, isopropanol, n-butanol, isobutanol, terbutanol, glycerin, ethoxylated alcohols, propoxylated alcohols, hydroformylation products of alkenes or mixtures thereof) and dispersing additives compatible with water (for example: sodium lauryl sulfate, castor oil ethoxylate 40 moles, sulphosuccinate, monoesters of C12-C14 oxoalkols or mixtures thereof). The solvent and the dispersing additives also have the function and the advantage of improving the stability over time, ease of dispersion in water and effectiveness.

The Anionic Product

The anionic product may be in liquid version or powder version. The latter is obtained by removing water from the liquid form, conveniently by a spray-drying process. The anionic product in liquid version should preferably include the following components (parts by weight):

- 1 part of tannins vegetable extracts in aqueous solution preferably at 45-50% dry,
- 3 to 20 parts of dispersants, and
- 0 to 1 part of solvents or stabilizers.

The tannins vegetable extracts which may be used for the present technology may comprise hydrolyzable or condensed tannins, optionally also in addition to other vegetable tannins, but conveniently they are hydrolyzable type tannins, especially of the gallic type.

More preferably, the following extracts and their mixtures are used:

- liquid extract of Tara, preferably obtained with the following procedure: extract the pods of Peruvian Tara (*Caesalpinia spinosa*) with ethanol (e.g. 80% Vol.). The extract obtained is removed from the solvent with a stripping process with water. The product obtained is concentrated under vacuum to eliminate the water up to preferably 44-46% of dry matter. The minimum content of tanning substances, according to the ISO14088 method, is preferably between 96 and 98% on a dry basis;
- liquid extract of Chinese gall, preferably obtained as the previous one, but by extracting Chinese galls, natural growths produced from the leaves of the Chinese sumac plant (*Rhus chinensis*), and ground. The minimum content of tanning substances, according to the ISO14088 method, is preferably higher than 98% on a dry basis;
- liquid extract of Turkish gall, preferably obtained as the previous one, but extracting Turkish galls, natural growths produced from the bark of the Aleppo oak plant (*Quercus infectoria*), and ground. The minimum content of tanning substances, according to the ISO14088 method, is preferably higher than 98% on a dry basis; and liquid chestnut extract, preferably obtained by extracting chestnut wood (*Castanea sativa*) with hot water and concentrating under vacuum to eliminate the water up to preferably 46-48% dry matter. The minimum content of tanning substances, according to the ISO14088 method, is preferably between 78 and 80% on a dry basis.

The dispersants are preferably natural and synthetic polyphenols. Among the natural dispersants, lignosulfonates, distillation stillages or mixtures thereof may be mentioned by way of non-limiting example.

Lignosulfonates derive from the cellulose production process in the paper industry.

Distillation stillages are residues from the distillation of alcoholic musts deriving from the fermentation processes of various agricultural products which may be grapes, potatoes, cereals, beet molasses or other sugary raw materials, such as those used in bioethanol production processes.

It is particularly convenient to use liquid quebracho sulfited extract and liquid ammonium lignosulfonate, both in aqueous solution preferably at 45-50% dry. Among the synthetic dispersants it is preferable to use sulfonated disulfonic polymers [also defined as "Benzenesulfonic acid, hydroxy-, monosodium salt, reaction products with formaldehyde and sulfonylbis[phenol], sodium salts" (CAS no. 90218-44-3)], sulfonated naphthalene polymers [also defined as "Naphthalenesulfonic acids, reaction products with formaldehyde" (CAS no. 91078-68-1)] or mixtures thereof. It is particularly convenient to use a liquid sulfonated disulfonic polymer, aqueous solution at 45-50% dry.

The solvents are preferably polar solvents with a stabilizing effect; non-limiting examples are: glycerin, monopropylene glycol, ethylene glycol, diethylene glycol, triethylene glycol, methoxylated, ethoxylated and propoxylated derivatives of the above, water or mixtures thereof. Particularly suitable is a 50/50 mixture of water and monopropylene glycol.

Embodiment Examples of the Technology

Example 1

Preparation of the cationic product. In a mixer, load the following percentages by weight in order:

| | |
|---|---|
| distearylethyl hydroxyethylammonium methyl sulfate | 44% |
| isopropanol | 4% |
| oxoalcohols C12-14 | 2.5%. |

Slowly heat up to 45° C. for 30', start stirring, then add the following water 4 times:

| | |
|---|---|
| water | 49.5%. |

Keep stirring for 60 minutes and check for lumps. The appearance of the product at 20° C. and 35° C. is an ivory white paste, at 10% in water it looks like a semi-transparent-semi-milky emulsion. The cationic product thus formulated may be used in a percentage by weight with respect to the weight of the leather in pickle from 0.5 to 7%, preferably from 1 to 4%, conveniently from 2 to 3%.

Example 2

Preparation of the anionic product in liquid form. The components indicated below must be conveniently added in the order shown in a mixer suitable for homogenization at room temperature. The percentages are by weight:

Dispersants, Aqueous Solutions at 45-50% Dry:

| | |
|---|---|
| sulfonated disulfonic polymer | 63.3% |
| sulfonated naphthalene polymer | 18% |
| tannins vegetable extracts, aqueous solutions at 45-50% dry: | |
| liquid extract of Chinese gall | 2.6% |
| liquid extract of Turkish gall | 4.4% |
| solvent: | |
| water and monopropylene glycol 50/50 | 11.7%. |

Example 3

Preparation of the anionic product in powder form.

Feed the atomizer with the liquid product prepared as described in Example 2. Maintain the feed flow of the liquid product and the temperature of the air entering the atomization chamber so that the temperature of the air leaving is 90±2° C. As an alternative to the atomizer, other types of evaporators may be used, such as freeze dryers, vacuum atomization evaporators, falling film evaporators with solid scraping system. Approximately 2.4 kg of liquid product are required to obtain 1 kg of powder product. The anionic product in powder form thus produced may be conveniently used in a weight percentage with respect to the weight of the leather in pickle from 8 to 25%, preferably from 12 to 20%, reasonably from 15 to 18%.

Example 4

Below is a recipe for pre-tanning leather in a drum of the experimental tannery using the technology described. The percentages of the products to be used refer to the weight of the leather in pickle loaded into the drum, which also corresponds to the weight of the pelt.

Load into the drum:

1) two halves (half cowhides) in pickle, the raw of which was of French origin, thickness from 1.8 to 2.0 mm, total weight of the two halves 17.3 kg, pH of the hides 3.0-3.1,
2) if necessary, add the waste water from the previous pre-tanning to reduce the COD, run the drum for 30 minutes, drain,
3) add (50%) 8.65 kg of 8% aqueous solution of NaCl (density 7°Bé),
4) spin the drum for 20 minutes,
5) add (2%) 346 g of cationic product described in Example 1, spin for 2 hours,
6) add (15%) 2.595 kg of anionic product in powder form described in Example 3, spin continuously for 2 hours and in the subsequent 10 hours alternately spin for 10 minutes and wait 30 minutes at room temperature of 20-25° C., then another 2 hours of continuous rotation at 38° C.,
7) add (50%) 8.65 kg of water at 38° C.,
8) spin the drum for 20 minutes, 9) drain the bath,
10) wash by adding (200%) 34.6 kg of water at room temperature,
11) drain the bath and the leathers,
12) put the leathers to rest on a stand for 24 hours,
13) the ST is 72° C.,
14) press the pre-tanned leathers to remove excess water, and
15) shave the leathers up to a thickness of between 1.1 and 1.2 mm.

The shaved leathers will then be re-tanned with a standard recipe normally used also with leathers pre-tanned with glutaraldehyde. The standard re-tanning includes a variable mixture of natural tannins, such as powdered Tara pod (*Caesalpinia spinosa*), synthetic tannins such as disulfonic polymers, possibly also with acrylic polymers. In the same re-tanning step, the leathers are also dyed with acid aniline-based dyes. Subsequently, the leathers are then greased using normally natural sulfited greases. After this step, the leathers are dried and moved on to the subsequent finishing and cutting steps.

The bath drained after the pre-tanning (step 9) may be recovered (possible step 2) more efficiently than what may normally be done after a classic re-tanning in which this step has no particular advantage. In fact, the waste water (step 9), which typically has COD (Chemical Oxygen Demand) values of about 80,000 mg/L, if used in step 2 of the subsequent pre-tanning, since it contains particularly reactive organic substance on the leather in pickle, effectively reduces its COD content and may thus be drained at 12,000-15,000 mg/L of COD. This is an advantageous aspect from the point of view of the environmental impact of the leather tanning process with this technology.

Example 5

One proceeds as in Example 4, but using 2% of cationic product described in Example 1 and 18% of anionic product in powder form described in Example 3, ST=74° C.

Example 6

One proceeds as in Example 4, but using 1% of cationic product described in Example 1 and 18% of anionic product in powder form described in Example 3, ST=73° C.

Example 7

One proceeds as in Example 4, but using 3% of cationic product described in Example 1 and 15% of anionic product in powder form described in Example 3, ST=72° C.

Example 8

One proceeds as in Example 4, but using 3% of cationic product described in Example 1 and 20% of anionic product in powder form described in Example 3, ST=75° C.

What is claimed is:

1. A process for tanning leathers, the process comprising a pre-tanning step and a tanning step, wherein in the pre-tanning step the leathers are treated with a cationic active agent comprising a quaternized ester of a fatty acid and of triethanolamine, or mixtures thereof and, subsequently, with an anionic active agent comprising tannins vegetable extracts and a natural or synthetic dispersant selected from the group consisting of lignosulfonates, distillation stillages, sulfonated disulfonic polymers, sulfonated naphthalene polymers or mixtures thereof, to obtain leathers with a shrinkage temperature of at least 65° C., and wherein said pre-tanning and tanning steps do not include a treatment with aldehydes or aldehyde donor compounds and/or with metal salts.

2. The process of claim 1, wherein the tanning step comprises a treatment of the pre-tanned leathers with the anionic active agent comprising tannins vegetable extracts and a natural or synthetic dispersant selected from the group consisting of lignosulfonates, distillation stillages, sulfonated naphthalene polymers or mixtures thereof.

3. The process of claim 1, wherein the cationic active agent is a solution comprising a dialkyl ester of triethanolamine methyl sulfate in which alkyl is a linear or branched group having from 12 to 24 carbon atoms.

4. The process of claim 1, wherein the cationic active agent is a compound selected from the group consisting of distearoylethyl hydroxyethylammonium methyl sulfate, a mixture of distearoylethyl hydroxyethylammonium methyl sulfate with cetearyl alcohol and docosanyltrimethylammonium methyl sulfate and mixtures thereof.

5. The process of claim 1, wherein the cationic active agent is a solution comprising said quaternized ester of a fatty acid and of triethanolamine and a solvent selected from the group consisting of water, ethanol, n-propanol, isopropanol, n-butanol, isobutanol, terbutanol, glycerin, ethoxylated alcohols, propoxylated alcohols, hydroformylation products of alkenes or mixtures thereof and optional dispersing additives selected from the group consisting of sodium lauryl sulfate, ethoxylated castor oil (40 moles) sulphosuccinate, monoesters of C12-C14 oxoalcohols or mixtures thereof.

6. The process of claim 1, wherein the anionic active agent comprises hydrolyzable tannins.

7. The process of claim 6, wherein the hydrolyzable tannins comprise an extract selected from the group consisting of liquid extract of Tara, liquid extract of Chinese gall, liquid extract of Turkish gall and liquid extract of chestnut or mixtures thereof.

8. The process of claim 1, wherein in the anionic active agent, the dispersant is selected from liquid quebracho sulfited extract and liquid ammonium lignosulfonate.

9. The process of claim 1, wherein in the anionic active agent, the dispersant is selected from "benzene-sulfonic acid, hydroxy-, monosodium salt, reaction products with formaldehyde and sulfonylbis(phenol), sodium salts" with the CAS No. 90718-44-3 and "naphthalenesulfonic acids, reaction products with formaldehyde" with the CAS No. 97078-68-1 and mixtures thereof.

10. The process of claim 1, wherein the anionic active agent comprises tannins vegetable extracts and dispersants in a ratio of from 1:3 to 1:20, in a polar solvent, said ratio being expressed as a weight ratio between a 45-50% solution of vegetable extract and dispersant.

11. The process of claim 10, wherein the polar solvent is selected from the group consisting of glycerin, monopropylene glycol, ethylene glycol, diethylene glycol, triethylene glycol, methoxylated, ethoxylated or propoxylated derivatives thereof, water and mixtures thereof.

12. The process of claim 1, wherein in the tanning step the pre-tanned leathers are tanned with a mixture of natural tannins optionally in combination with synthetic tannins and optionally acrylic polymers.

* * * * *